US012054305B2

(12) United States Patent
Patry et al.

(10) Patent No.: US 12,054,305 B2
(45) Date of Patent: Aug. 6, 2024

(54) DOUBLE WALL COMPOSITE DRUM ASSEMBLY AND PROCESS FOR MANUFACTURING SAME

(71) Applicant: 9387-6670 Québec Inc., Québec (CA)

(72) Inventors: Sylvain Patry, Québec (CA); Jean-Luc Richard, Québec (CA)

(73) Assignee: 9387-6670 Québec Inc. (CA)

( * ) Notice: Subject to any disclaimer, the term of this patent is extended or adjusted under 35 U.S.C. 154(b) by 0 days.

(21) Appl. No.: 17/795,150

(22) PCT Filed: Feb. 25, 2021

(86) PCT No.: PCT/CA2021/050223
§ 371 (c)(1),
(2) Date: Jul. 25, 2022

(87) PCT Pub. No.: WO2021/168566
PCT Pub. Date: Sep. 2, 2021

(65) Prior Publication Data
US 2023/0059443 A1 Feb. 23, 2023

Related U.S. Application Data

(60) Provisional application No. 62/982,139, filed on Feb. 27, 2020.

(51) Int. Cl.
*B65D 8/00* (2006.01)
*B29C 41/06* (2006.01)
(Continued)

(52) U.S. Cl.
CPC .............. *B65D 11/06* (2013.01); *B29C 41/06* (2013.01); *B29C 41/20* (2013.01); *B65D 15/02* (2013.01);
(Continued)

(58) Field of Classification Search
CPC ...... B65D 11/06; B65D 15/02; B65D 39/082; B65D 77/0493; B65D 7/045; B29C 41/06;
(Continued)

(56) References Cited

U.S. PATENT DOCUMENTS 2,301,075 A * 11/1942 Nyberg ................. B65D 7/045
220/62.12
2,787,397 A 4/1957 Radford
(Continued)

FOREIGN PATENT DOCUMENTS

EP 0134363 A2 3/1985
EP 0223367 A2 5/1987
(Continued)

OTHER PUBLICATIONS

PCT/CA2021/050223 International Search Report and Written Opinion of the International Searching Authority dated Apr. 28, 2021 (8 pages).
(Continued)

*Primary Examiner* — Shawn M Braden
(74) *Attorney, Agent, or Firm* — Amundsen Davis, LLC

(57) ABSTRACT

The present disclosure concerns process for manufacturing a closed head composite drum assembly, comprising: providing an inner shell defining a material-receiving cavity forming a material-filling opening in the inner shell; rotomolding at least partially a closed head outer drum defining an inner shell-containing cavity, the closed head outer drum at least partially enclosing the inner shell; and forming a bung opening in the closed head outer drum substantially in register with the material-filling opening. It also concerns a double wall closed head drum assembly.

17 Claims, 14 Drawing Sheets

(51) Int. Cl.
*B29C 41/20* (2006.01)
*B65D 39/08* (2006.01)
*B65D 77/04* (2006.01)
*B29L 31/00* (2006.01)

(52) U.S. Cl.
CPC ....... *B65D 39/082* (2013.01); *B65D 77/0493* (2013.01); *B29K 2023/06* (2013.01); *B29L 2031/7154* (2013.01)

(58) Field of Classification Search
CPC ................ B29C 41/20; B29K 2023/06; B29L 2031/7154
See application file for complete search history.

(56) References Cited

U.S. PATENT DOCUMENTS

| | | | | |
|---|---|---|---|---|
| 5,597,085 A | * | 1/1997 | Rauworth | B65D 77/06 220/639 |
| 5,897,016 A | * | 4/1999 | Wheaton | B65D 11/22 220/4.05 |
| 2004/0217553 A1 | * | 11/2004 | Shaw | F16J 15/108 277/628 |
| 2005/0115729 A1 | | 6/2005 | Shaw et al. | |
| 2008/0128412 A1 | * | 6/2008 | Dovey | B65D 25/28 251/356 |
| 2011/0266284 A1 | * | 11/2011 | Schmidt | B65D 77/06 220/495.06 |
| 2019/0217990 A1 | | 7/2019 | Weyrauch | |

FOREIGN PATENT DOCUMENTS

| | | |
|---|---|---|
| EP | 1281499 A1 | 2/2003 |
| EP | 3515832 A1 | 7/2019 |
| WO | 2007/061967 A2 | 5/2007 |
| WO | 2007061967 A2 | 5/2007 |

OTHER PUBLICATIONS

Extended European Search Report pursuant to Rule 62 EPC from the EUIPO dated Mar. 7, 2024 for EP application No. 21760578 (8 pages).

* cited by examiner

DOUBLE WALL COMPOSITE DRUM ASSEMBLY AND PROCESS FOR MANUFACTURING SAME

PRIOR APPLICATION

The present application claims priority from U.S. provisional patent application No. 62/982,139, filed on Feb. 27, 2020, and entitled "DOUBLE WALL COMPOSITE BARREL AND PROCESS FOR MANUFACTURING SAME", the disclosure of which being hereby incorporated by reference in its entirety.

TECHNICAL FIELD

The technical field relates to containers, and more particularly to composite drum assemblies comprising an inner shell and an outer closed head drum, and to a process for manufacturing the same.

BACKGROUND

Barrels with a stainless-steel liner are known, which are used, for instance, for application in the food and medical fields. However, such barrels are usually fragile, can sometimes be hardly cleaned and can be easily deformed in case of impacts.

In view of the above, there is a need for a barrel or drum assembly with an inner shell, which can be made of stainless-steel, and an outer shell and to a process to manufacture same which would be able to overcome or at least minimize some of the above-discussed prior art concerns.

BRIEF SUMMARY

It is therefore an aim of the present invention to address the above-mentioned issues.

According to a first general aspect, there is provided a process for manufacturing a closed head composite drum assembly, comprising: providing an inner shell defining a material-receiving cavity forming a material-filling opening in the inner shell; rotomolding at least partially a closed head outer drum defining an inner shell-containing cavity, the closed head outer drum at least partially enclosing the inner shell; and forming a bung opening in the closed head outer drum substantially in register with the material-filling opening.

According to another general aspect, there is provided a double wall closed head drum assembly, comprising: a closed head outer drum defining an inner shell-containing cavity and comprising: a sidewall defining a cover-connecting edge, and a barrel cover irremovably secured to the cover-connecting edge of the sidewall and delimiting therewith at least partially the inner shell-containing cavity; and an inner shell at least partially contained in the inner shell-containing cavity; wherein the closed head outer drum is at least partially made of plastic.

According to another general aspect, there is provided a closed head drum composite assembly, comprising: a closed head outer drum defining an inner shell-containing cavity forming a bung opening in the closed head outer drum; and an inner shell at least partially contained in the inner shell-containing cavity, a material-filling opening being formed in the inner shell substantially in register with the bung opening; wherein the closed head outer drum is at least partially made of plastic.

According to another general aspect, there is provided a barrel comprising an outer shell defining an inner shell-receiving cavity and having a sidewall with a free edge, the inner shell-receiving cavity forming an opening at least partially delimited by the free edge; an inner shell at least partially inserted in the inner shell-receiving cavity; and a barrel cover irremovably secured to the free edge of the outer shell and closing at least partially the opening.

According to another general aspect, there is provided a process for manufacturing a barrel, comprising providing an outer shell defining an inner shell-receiving cavity and comprising a free edge, the inner shell-receiving cavity forming an opening at least partially delimited by the free edge; providing an inner shell; inserting at least partially the inner shell through the opening in the inner shell-receiving cavity; and rotomolding a barrel cover onto the free edge so as to close at least partially the opening.

DETAILED DESCRIPTION

Figure 1:
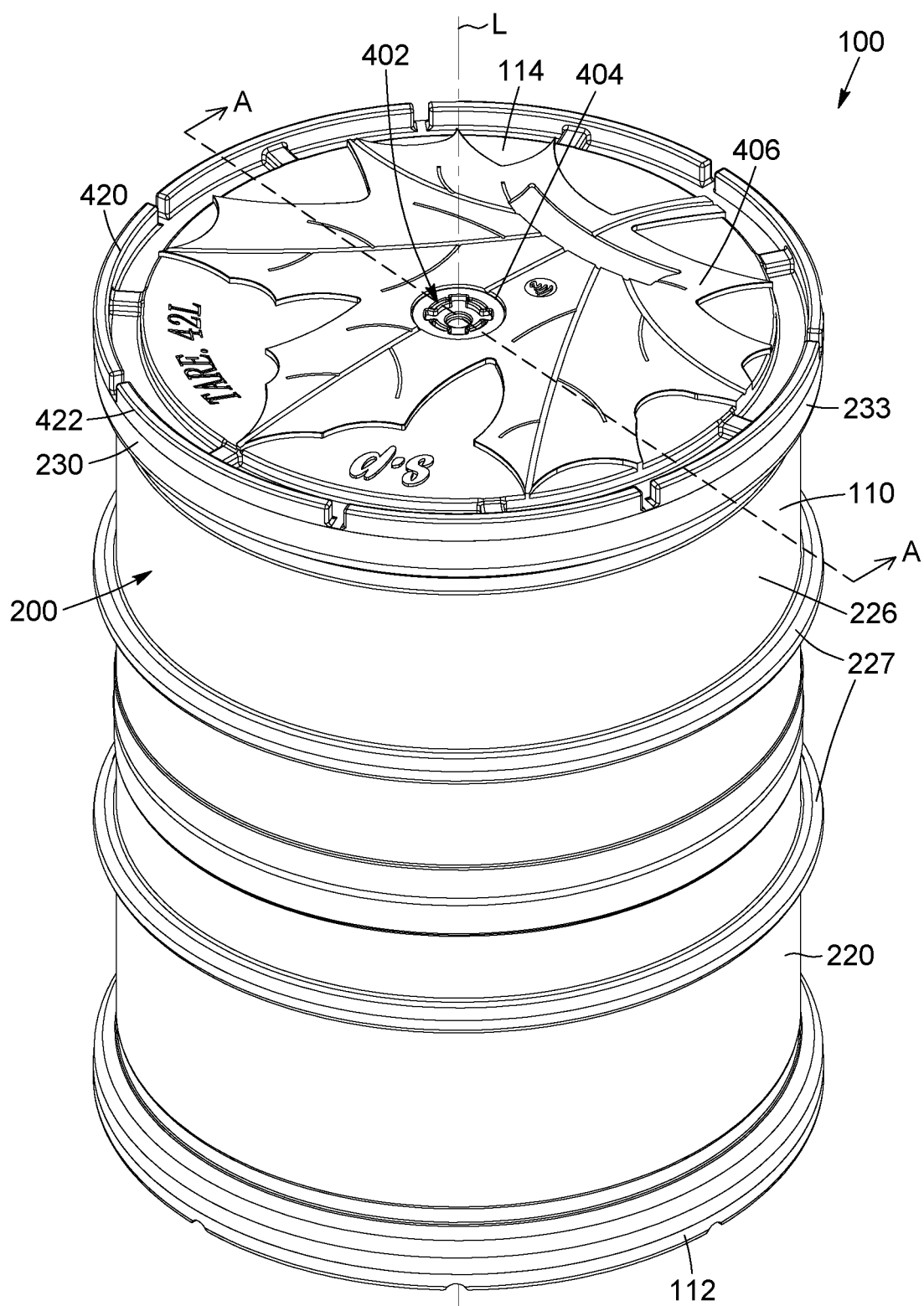
FIG. 1 is a top perspective view of a closed head composite drum assembly in accordance with a first embodiment.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only. Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the composite barrel or drum assembly and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Composite Barrel Assembly/Closed Head Composite Drum Assembly/Tight Head Composite Drum Assembly Referring now to the drawings, and more particularly to FIGS. 1 to 5, there is shown a composite barrel assembly 100 (or composite container assembly 100 or double wall composite barrel assembly 100 or closed head composite drum assembly 100 or double wall closed head drum assembly 100) in accordance with a first embodiment. In the following description, a closed head drum, also known as a tight head drum, designates a drum having a non-removable top portion and wherein one can only access an inner volume thereof via a plug arranged in a bung opening or filling aperture formed in the top portion or cover of the container. In other words, on a tight or closed head drum, a head thereof is an integral part of the drum construction (i.e., both ends thereof are permanently sealed).

In the non-limitative embodiment, the closed head composite drum assembly 100 is substantially cylindrical in shape and includes an outer peripheral wall 110 and two spaced-apart drum end walls 112, 114 (or lower and upper drum end walls 112, 114) defining together an inner cavity (or chamber) 102. The closed head composite drum assembly 100 can be used, for instance and without being limitative, for applications in the food or in medical fields. For instance and without being limitative, the composite barrel or drum assembly 100 can be used to store maple syrup or any other liquid or material having a granularity high enough for it to be poured and to at least partially fill a material-receiving cavity 302.

In the embodiment shown, and as detailed below, the double wall closed head drum assembly 100 comprises an outer shell 200 or closed head outer drum 200, which in the embodiment shown is at least partially made of plastic, defining an interior (inner) cavity 202 (or inner shell-receiving cavity 202 or inner shell-containing cavity 202). In the embodiment shown, the closed head outer drum 200 is at least partially rotomolded. A filling aperture 402 (or bung opening 402) is formed in the closed head outer drum 200.

The double wall closed head drum assembly 100 further comprises an inner shell 300 at least partially contained in the inner shell-receiving cavity 202 (or inner shell-containing cavity 202) and lining at least partially the outer peripheral wall 110 and the drum end walls 112, 114. A material-filling opening 332 is formed in the inner shell 300 which is substantially in register with the bung opening 402 formed in the closed head outer drum 200. In the embodiment shown, the inner shell 300 is at least partially made of stainless-steel.

Outer Shell/Closed Head Outer Drum

In the embodiment shown, the closed head outer drum 200 (or outer shell 200) is substantially cylindrical and has a drum base 210 and a drum sidewall 220 extending upwardly from the drum base 210. The drum sidewall 220 has a peripheral wall 229 with an upper portion 222 and an upper rim 230 (or peripheral rim 230) extending from the upper portion 222 of the peripheral wall 229 and defining at least partially a cover-connecting edge 231 of the drum sidewall 220. The outer shell 200 being located outwardly with respect to the inner shell 300, the drum base 210 of the outer shell 200 defines one of the end walls 112 (or lower end wall 112) of the closed head composite drum assembly 100 and the drum sidewall 220 defines the peripheral wall 110 of the closed head composite drum assembly 100.

In the embodiment shown, the closed head outer drum 200 further comprises a barrel cover 400 irremovably secured to the cover-connecting edge 231 of the drum sidewall 220 (for instance to the upper rim 230 thereof) and delimiting at least partially, with the drum sidewall 220, the inner shell-containing cavity 202. The barrel cover 400 of the outer shell 200 thus defines the other one of the end walls 114 (or upper end wall 114) of the closed head composite drum assembly 100.

In the embodiment shown, the outer shell 200 or closed head outer drum 200 is at least partially made of Linear Low-density polyethylene (LLDPE), High Density Polyethylene (HDPE), Cross Linked Polyethylene (XLPE), Polyethylene (PE), Polypropylene (PP), Nylon (PA), Polycarbonate (PC), Plastomer, Thermoplastic elastomer (TPE), Plasticized polyvinyl chloride (PVC), Polyvinylidene fluoride (PVDF) and the like or any other material that could be used in rotational molding. Outer shells formed in other materials, such as composite recycled plastics could also be conceived.

In the embodiment shown, the drum sidewall 220 of the outer shell 200 is substantially cylindrical and has a longitudinal axis L. As detailed below, the inner shell 300 is substantially coaxial with the outer shell 200 so that, unless otherwise stated, the longitudinal axis L will apply to the outer shell 200, the inner shell 300 and/or the composite barrel or composite drum assembly 100.

The drum sidewall 220 of the outer shell 200 has an inner surface 224, at least partially delimiting the inner shell-receiving cavity 202, and an opposed outer surface 226. In the embodiment shown, as represented in FIG. 1, peripheral annular protrusions 227 (two in the embodiment shown) are formed on the outer surface 226 of the drum sidewall 220. For instance, the peripheral annular protrusions 227 extend along at least a portion of the outer periphery of the drum sidewall 220 (along substantially an entirety of the outer periphery thereof, in the embodiment shown) and are shaped and dimensioned to ease the handling of the composite barrel or container assembly 100.

Figure 3:
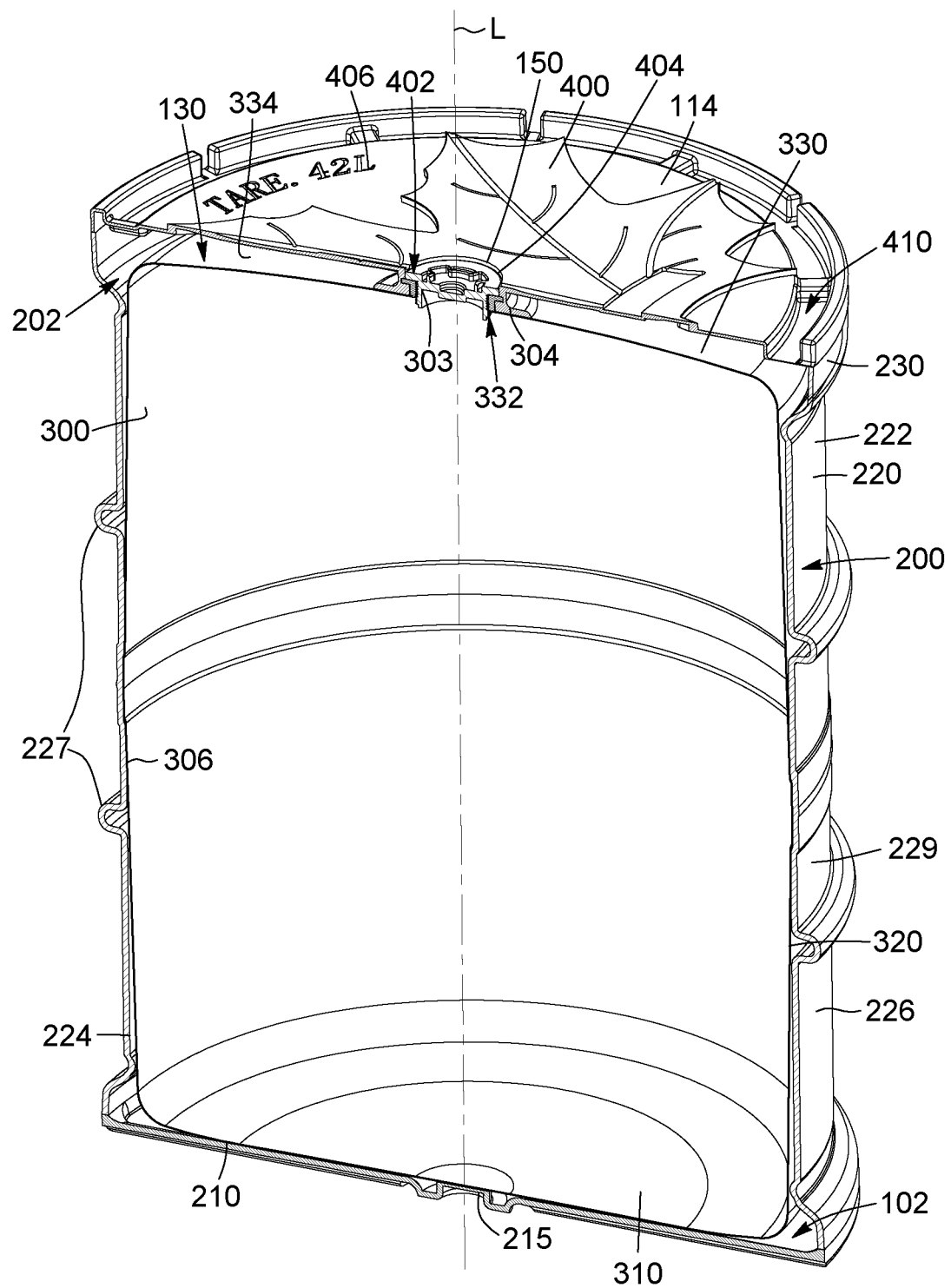
FIG. 3 is a sectional view of the closed head composite drum assembly of FIG. 1 taken along cross-section lines A-A.

As best shown in FIG. 3, the drum base 210 has an outer cross-section, considered in a direction substantially perpendicular to the longitudinal axis L, that is greater than an outer cross-section of the drum sidewall 220 (at least in portions thereof which do not contain the peripheral protrusions 227), to increase the stability of the barrel assembly 100 when standing on the drum base 210 of the outer shell 200.

In the embodiment shown, as best shown in FIG. 3, the upper rim 230 of the outer drum 200 has an outer cross-section, considered in a direction substantially perpendicular to the longitudinal axis L, that is greater than the outer cross-section of the sidewall 220 (at least in portions thereof which do not contain the peripheral protrusions 227), for instance at least at the upper portion 222 thereof. For instance, the outer cross-section of the upper rim 230 is substantially equal to the outer cross-section of the drum base 210.

As detailed below, in the embodiment shown wherein the outer shell 200 is made of plastic, the outer shell—or closed head outer drum—200 is at least partially rotomolded. Other manufacturing processes for the outer shell 200 could be conceived, such as, for instance, injection molding, blow molding or thermoforming.

It is appreciated that the shape and/or the configuration of the outer shell or closed head outer drum 200 can vary from the embodiment shown.

Inner Shell

Figure 5:
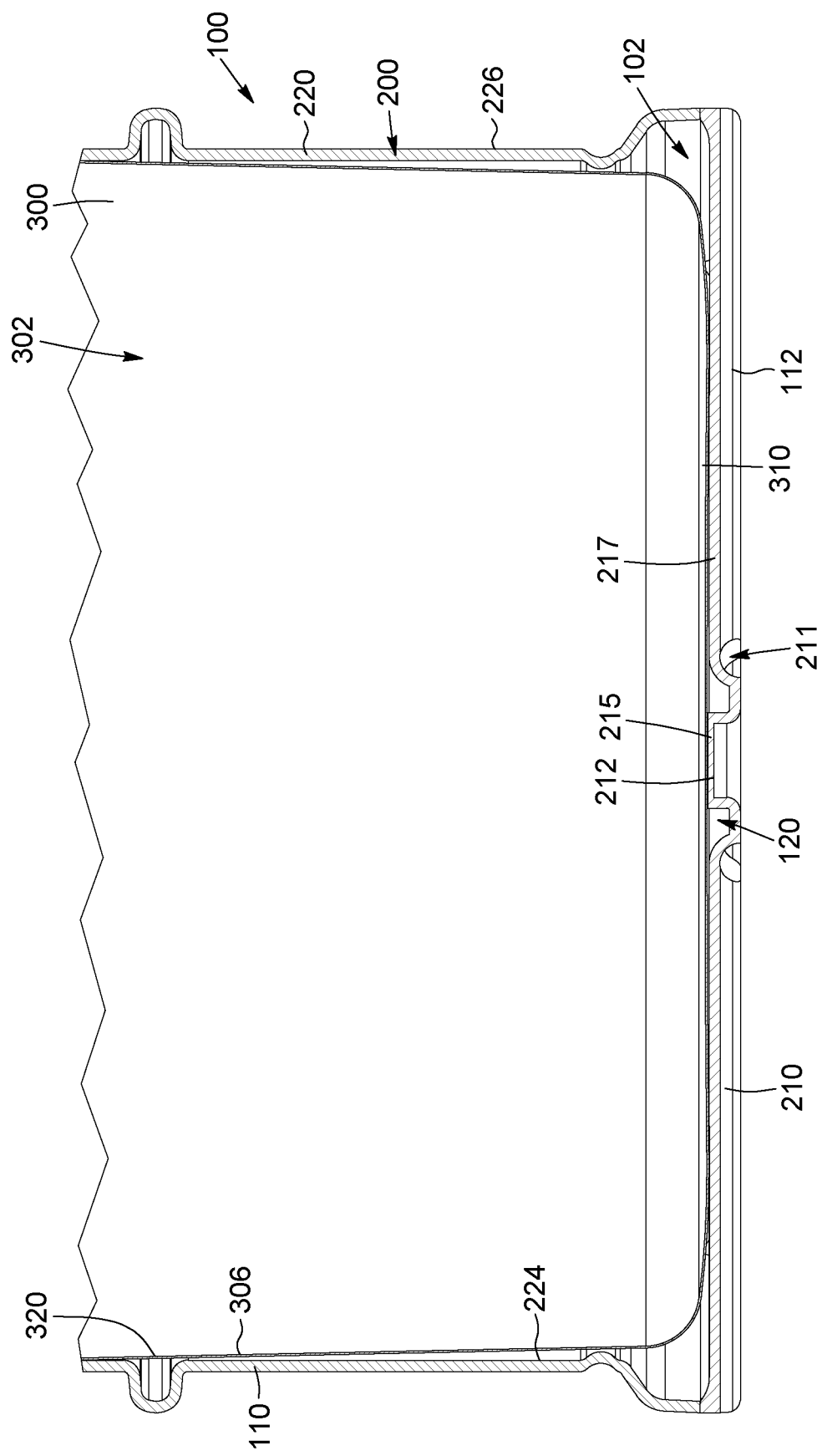
FIG. 5 is an enlarged cross-section view of a lower portion of the closed head drum assembly of FIG. 3.

The inner shell 300 comprises a base 310. As best shown in FIG. 5, at least a portion of the base 310 is spaced-apart from the drum base 210 of the outer shell 200. A lower shock-absorbing spacing 120 is thus formed between the base 310 of the inner shell 300 (an outer surface thereof) and an inner surface of the drum base 210 of the outer shell 200 (which forms the lower end wall 112 of the closed head composite drum assembly 100). In the embodiment shown, the lower shock-absorbing spacing 120 is filled with air.

In the embodiment shown, the drum base 210 of the outer shell 200 has a plurality of outer peripheral portions 219 (being for instance substantially sector-shaped) axially spaced apart from the base 310 of the inner shell 300, whereas, in or adjacent to a central portion 314 thereof, the base 310 of the inner shell 300 at least partially contacts the inner surface of the drum base 210 of the outer shell 200. More particularly, in the embodiment shown, the outer shell 200 has a central inner base-abutting portion 215 (having for instance a substantially circular shape) protruding inwardly (with respect to the interior cavity 202 of the outer shell 200) from a remaining portion of the inner surface of the drum base 210 thereof.

Figure 2:
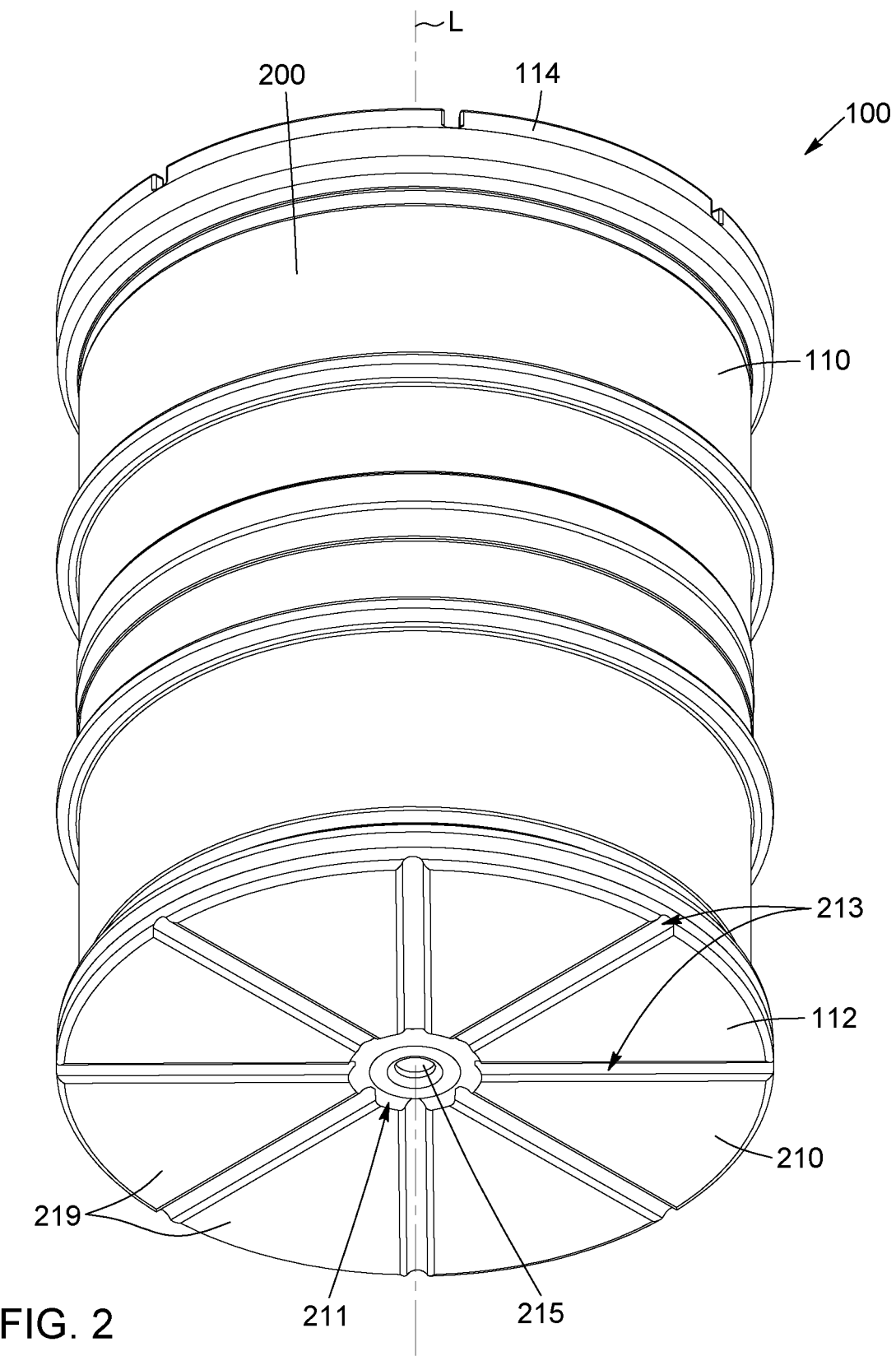
FIG. 2 is a bottom perspective view of the closed head composite drum assembly of FIG. 1.

In the embodiment shown, as best shown in FIGS. 2 and 5, an annular depression 211 is formed in the drum base 210, around a central portion 212, forming an indentation in the interior—or inner shell-containing—cavity 202 defined by the closed head outer drum 200. Moreover, as best shown in FIGS. 2 and 5, the outer shell 200 has a plurality of radial depressions 213 extending between adjacent sector-shaped outer peripheral portions 219. The radial depressions 213 form a plurality of radial indentations in the inner shell-containing cavity 202. In other words, the drum base 210 comprises a plurality of radial inner base-abutting portions 217 extending radially from the annular depression 211 and protruding inwardly (with respect to the interior cavity 202 of the outer shell 200) from a remaining portion of the drum base 210.

The inner base abutting portion 215 and the plurality of radial inner base-abutting portions 217 are shaped and dimensioned to at least partially support the base 310 of the inner shell 300 when the inner shell 300 is at least contained in the interior cavity 202—or inner shell-containing cavity 202—at least partially defined by the outer shell 200. It is appreciated that the shape, the position, the number and/or the relative arrangement of the inner base abutting portion 215 and/or the radial inner base-abutting portions 217 can vary from the embodiment shown.

Figure 4:
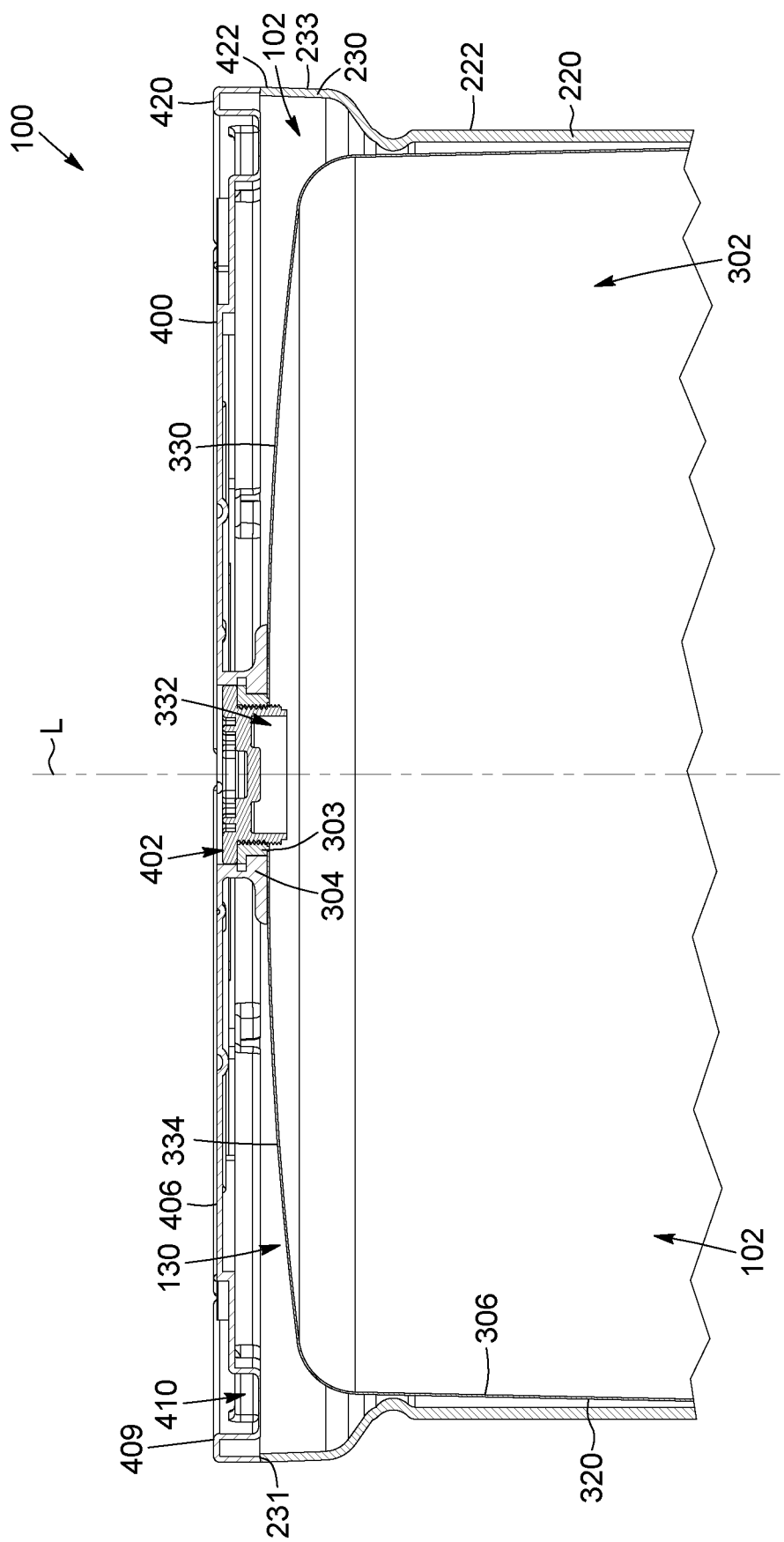
FIG. 4 is an enlarged cross-section view of an upper portion of the closed head drum assembly of FIG. 3.

Referring now to FIGS. 3 to 5, there is shown that the inner shell 300 further comprises a sidewall 320 (or peripheral wall 320) extending upwardly from the base 310 and a top portion 330 (or cover portion 330). The base 310, the sidewall 320 and the cover portion 330 of the inner shell 300 define together the above-mentioned inner cavity 302 (or material-receiving cavity 302) of the inner shell 300. The inner cavity 302 (or material-receiving cavity 302) of the inner shell 300 has an inner volume comprised, for instance and without being limitative, between about 100 L and about 500 L. In some embodiments, the inner volume 302 of the inner shell 300 is comprised between about 100 L and about 400 L. In some other embodiments, the inner volume of the inner shell 300 is comprised between about 250 L and about 350 L.

In the embodiment shown, the sidewall 320 of the inner shell 300 is substantially cylindrical and is substantially coaxial with the drum sidewall 220 of the outer shell 200 when at least partially arranged—or contained—in the inner shell-receiving cavity 202 thereof. In the embodiment shown, the sidewall 320 of the inner shell 300 faces at least a portion of the inner surface 224 of the drum sidewall 220 of the outer shell 200, and at least partially contacts the inner surface 224 of the sidewall 220 of the outer shell 200. In some embodiment, a peripheral spacing can be defined between the inner surface 224 of the drum sidewall 220 of the outer shell 200 and the outer surface of the sidewall 320 of the inner shell 300.

In the embodiment shown, the material-filling opening 332 is formed in the cover portion 330 of the inner shell 300. The material-filling opening 332 opens into the inner cavity 302. In other words, the inner cavity 302 forms the material-filling opening 332 in the inner shell 300 (in the cover portion 330 thereof, in the embodiment shown). For instance, the inner shell 300 comprises a barrel cover-coupling portion 304, substantially ring-shaped in the embodiment shown, surrounding at least partially the material-filling opening 332 and protruding, in the embodiment shown, outwardly from an outer surface 334 of the cover portion 330 of the inner shell 300.

In the embodiment shown, the outer surface 334 of the cover portion 330 of the inner shell 300 forms a convexity towards the bung opening 402 of the outer shell 200 when the inner shell 300 is at least partially inserted in the inner shell-receiving cavity 202 of the outer shell 200.

In the embodiment shown, the cover portion 330 is at least partially axially offset (considered along the longitudinal axis L) with respect to the cover-connecting edge 231 (FIG. 4) of the upper rim 230 of the outer shell 200, i.e., the cover portion 330 of the inner shell 300 is at least partially recessed inwardly in the inner shell-receiving cavity 202 of the outer shell 200. In other words, in the embodiment shown, the inner shell 300 is substantially entirely contained (or enclosed) in the interior cavity 202 of the outer shell 200. In the embodiment shown, an apex of the convexity formed by the outer surface 334 of the inner shell cover portion 330 is substantially longitudinally aligned, considered with respect with the longitudinal axis L, with the cover-connecting edge 231 of the drum sidewall 220.

In the embodiment shown, the inner shell 300 is substantially seamless (for instance manufactured by laser welding) so that an inner surface 306 thereof, at least partially delimiting the material-receiving cavity 302 and at least partially formed by inner surfaces of the base 310, the sidewall 320 and the cover portion 330 thereof is substantially smooth in order to ease the cleaning of the material-receiving cavity 302 and the inner surfaces delimiting same.

It is appreciated that the shape and/or the configuration of the inner shell 300, as well as the shape, the configuration and/or the location of the sidewall, the base, the cover portion and the material-filling opening thereof can vary from the embodiment shown. For instance, even though the inner shell 300 is made in a material configured to maintain properties of a material stored in the inner cavity 302 thereof, the inner shell is not limited to a shell that would be at least partially made of stainless-steel; inner shells made at least partially of other materials having suitable conservation properties such as steel, galvanized steel, aluminum or an alloy of the above-mentioned possible materials, could also be conceived.

Barrel Cover of the Closed Head Outer Drum

Referring back to FIGS. 1 and 3, in the embodiment shown, the barrel cover 400 has an outer cross-section (considered in a direction substantially perpendicular to the longitudinal axis L) corresponding substantially to the outer cross-section of the upper rim 230 of the outer shell 200.

The filling aperture 402—or bung opening 402—is formed in the barrel cover 400 (or cover 400) in a substantially central portion 404 thereof. The filling aperture 402—or bung opening 402—is substantially in register with the material-filling opening 332 of the inner shell 300, so that the filing aperture 402 opens into the material-receiving cavity 302 of the inner shell 300. Moreover, the filling aperture 402 is engageable—for instance removably—with the barrel cover-coupling portion 304 so as to safely engage the cover 400 with the inner shell 300, in order to limit the risk of a displacement of the inner shell 300 in the inner shell-containing cavity 202, in particular with respect to the cover 400. Such a displacement of the inner shell 300 within the inner shell-containing cavity 202 would compromise the filling and the emptying of the inner shell 300. It is thus understood that the cover 400 is connected to the cover portion 330 of the inner shell 300 at least at the central portion 404 of the cover 400.

As best shown in FIGS. 1 and 3, the tight head composite drum assembly 100 also comprises a bung cap 150 (or drum plug 150) engageable with the bung opening 402 of the outer drum 200 and the barrel cover-coupling portion 304 of the inner shell 300 in order to close the bung opening 402 and the material-filling opening 332. For instance, a thread 303 is formed in or mounted to an inner surface of the barrel cover-coupling portion 304 for the drum plug 150 to removably engage therewith in a fluid-tight manner. Other mechanical fasteners could be conceived to close the bung opening 402 and the material-filling opening 332 in a fluid-tight manner.

Referring now to FIGS. 3 and 4, there is shown that the cover 400 further comprises a peripheral portion 406 surrounding the central portion 404. The peripheral portion 406 is at least partially spaced-apart from the cover portion 330 of the inner shell 300. An upper shock-absorbing spacing 130 is thus formed between the barrel cover 400 (an inner surface thereof) and the cover portion 330 of the inner shell 300 (an outer surface thereof). As represented in FIGS. 3 and 4, a peripheral recess 410 is formed in an upper surface of the cover 400 (or outer surface, considered with respect to the inner cavity 102 of the barrel assembly 100), for instance at a peripheral portion 409 thereof.

As detailed below, in the first embodiment shown, the barrel cover 400, the drum sidewall 220 and the drum base 210 of the outer shell 200—or closed head outer drum 200—might be rotomolded in a single step manufacturing process. In other words, the barrel cover 400 is formed integral with the upper rim 230 of the drum sidewall 220 (for instance formed integral with the cover-connecting edge 231 of the drum sidewall 220).

It is appreciated that other substantially irremovable mechanical fastening between the barrel cover 400 and the drum sidewall 220 (for instance the cover-connecting edge 231 thereof) of the outer shell 200 could be conceived. For instance, the cover 400 could be welded, glued to or as detailed below with reference to the second possible embodiment rotomolded onto the upper rim 230 of the outer shell 200. The expression "irremovably secured" relative to the mounting of the barrel cover 400 onto the drum sidewall 220 should be understood as meaning that the barrel cover 400 cannot be removed from (or separated from) the drum sidewall 220 without at least partially permanently damaging at least one of the barrel cover 400 and the drum sidewall 220. It is thus understood that, for instance and in some non-limitative implementations, no detachable fastener such as a thread is used to secure the cover 400 to the drum sidewall 220. No sealing member is neither required to ensure a fluid-tight closing of the inner shell-containing cavity 202 of the closed head composite drum 200 (at least at a junction between the drum sidewall 220 and the barrel cover 400).

In the non-limitative embodiment shown, the cover 400 is at least partially made of plastic (for instance linear low-density polyethylene (LLDPE)). Covers formed in other materials, such as composite recycled plastics could also be conceived.

Referring back to FIG. 1, in the embodiment shown, the cover 400 comprises a peripheral border (or rim) 420 surrounding at least partially the peripheral recess 410 and having an outer peripheral surface 422 (considered with respect to the inner cavity 102 of the closed head composite drum assembly 100). For instance, the outer peripheral surface 422 is substantially flush with, or aligned with, an outer surface 233 of the upper rim 230 (FIG. 4).

It is appreciated that the shape and/or the configuration of the cover 400, as well as the shape, the configuration and/or the relative arrangement of the peripheral portion and the central portion thereof can vary from the embodiment shown.

It is thus understood that the closed head composite drum assembly 100 is shaped and dimensioned to maintain the properties of the material stored therein (i.e. in the material-receiving cavity 302 of the inner shell 300), while allowing an easy cleaning thereof. Moreover, in particular due to the above-described upper and lower shock-absorbing spacings 130, 120 (i.e., due to the fact that at least some portions of the inner shell 300 are spaced-apart from the inner surface of the outer shell 200—from the inner surface of the drum sidewall 220 and/or from an inner surface of the barrel cover 400 thereof and/or from the inner surface of the drum base 210), the barrel assembly 100 is substantially resistant to impacts applied thereto.

Process for Manufacturing a Closed Head Composite Drum Assembly

Figure 14:
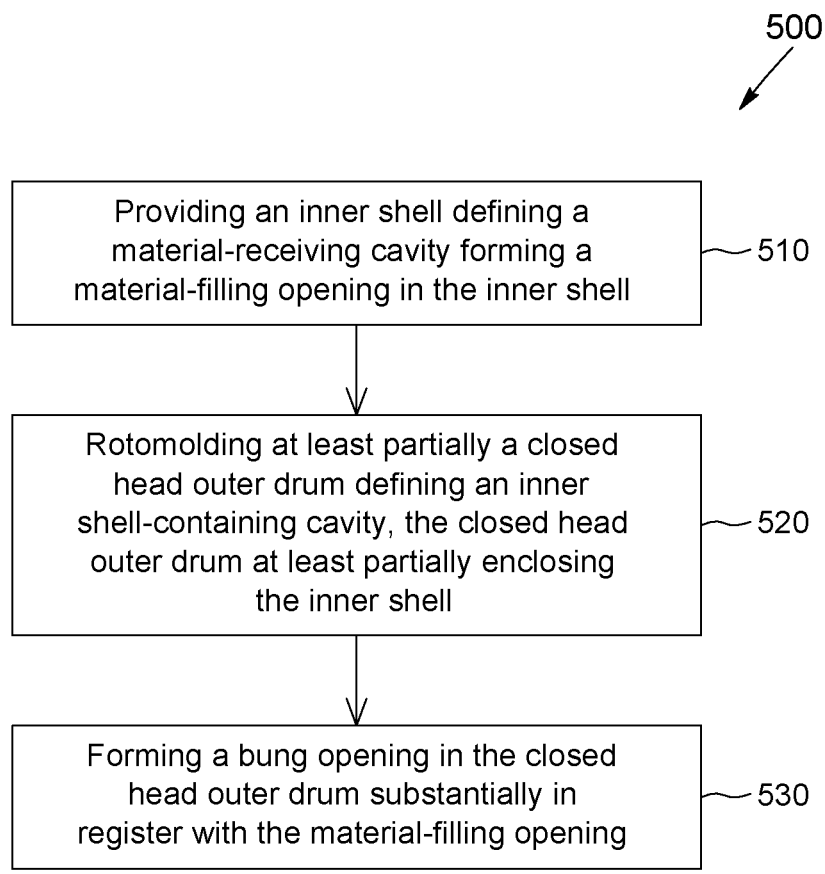
FIG. 14 is a block diagram detailing different steps of a process for manufacturing a closed head composite drum assembly in accordance with an embodiment.

According to another aspect, referring now to FIG. 14, there is provided a process 500 for manufacturing a closed head composite drum assembly 100—or plastic-insulated tight head drum assembly 100—according to the above-described embodiment.

In the embodiment shown, the process 500 comprises a step 510 of providing an inner shell 300 defining a material-receiving cavity 302 forming a material-filling opening in the inner shell 300; a step 520 of rotomolding at least partially a closed head outer drum 200 defining an inner shell-containing cavity 202, the closed head outer drum 200 at least partially enclosing the inner shell 300; and a step 530 of forming a bung opening 402 in the closed head outer drum 200 substantially in register with the material-filling opening 332.

Figure 7:
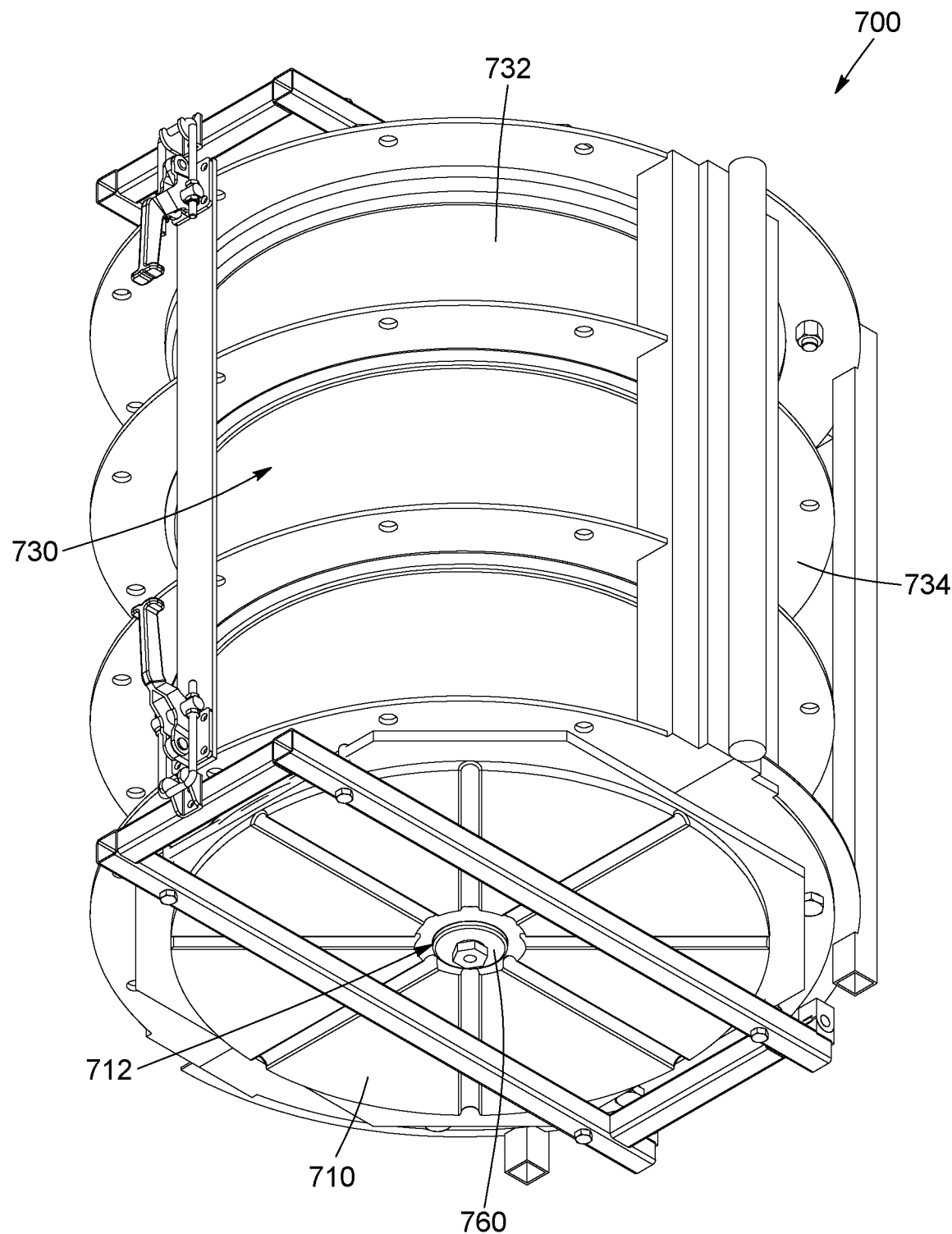
FIG. 7 is a bottom perspective view of the rotational molding apparatus of FIG. 6.
Figure 8:
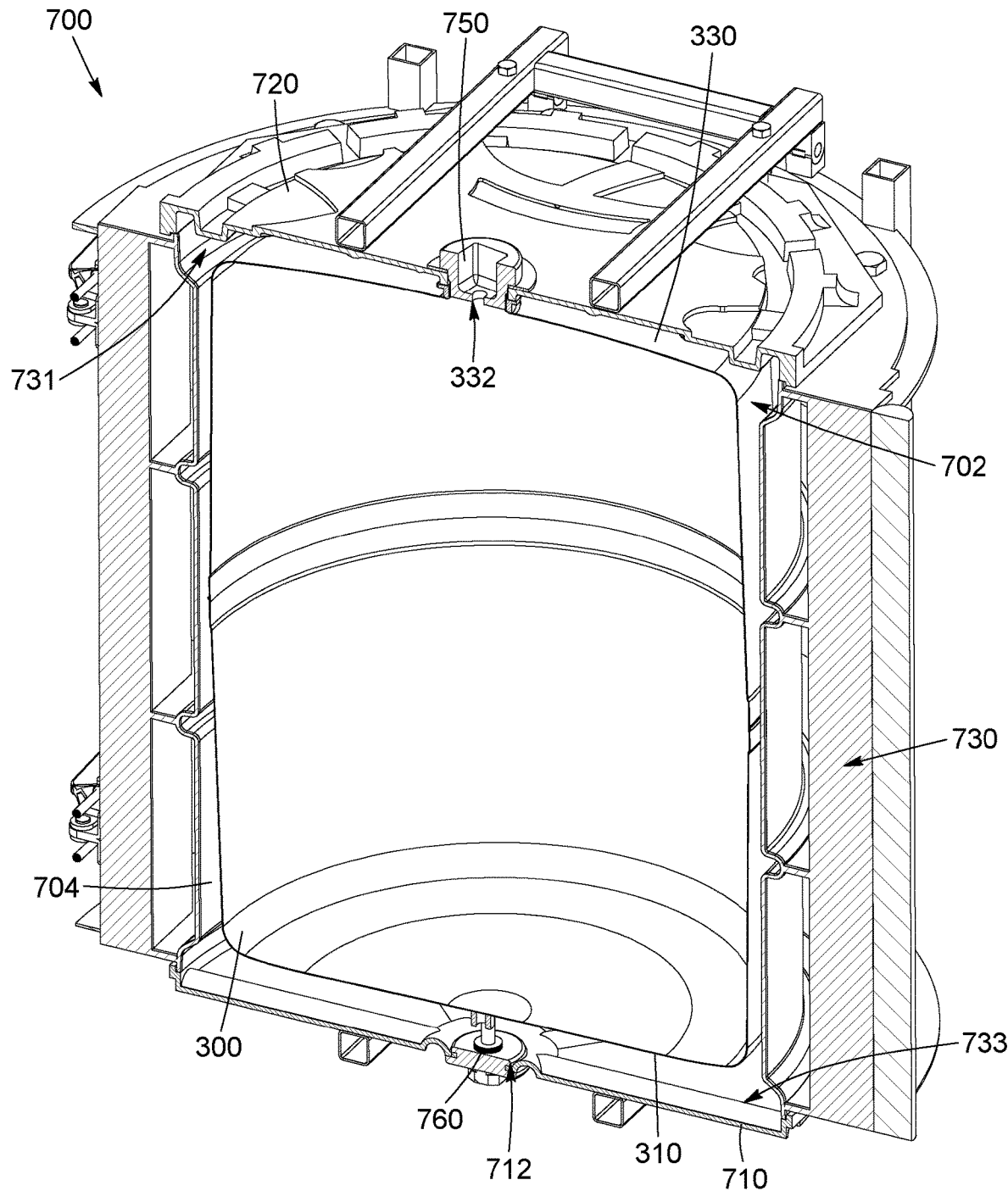
FIG. 8 is a sectional view of the rotational molding apparatus of FIG. 6 taken along cross-section lines B-B.
Figure 9:
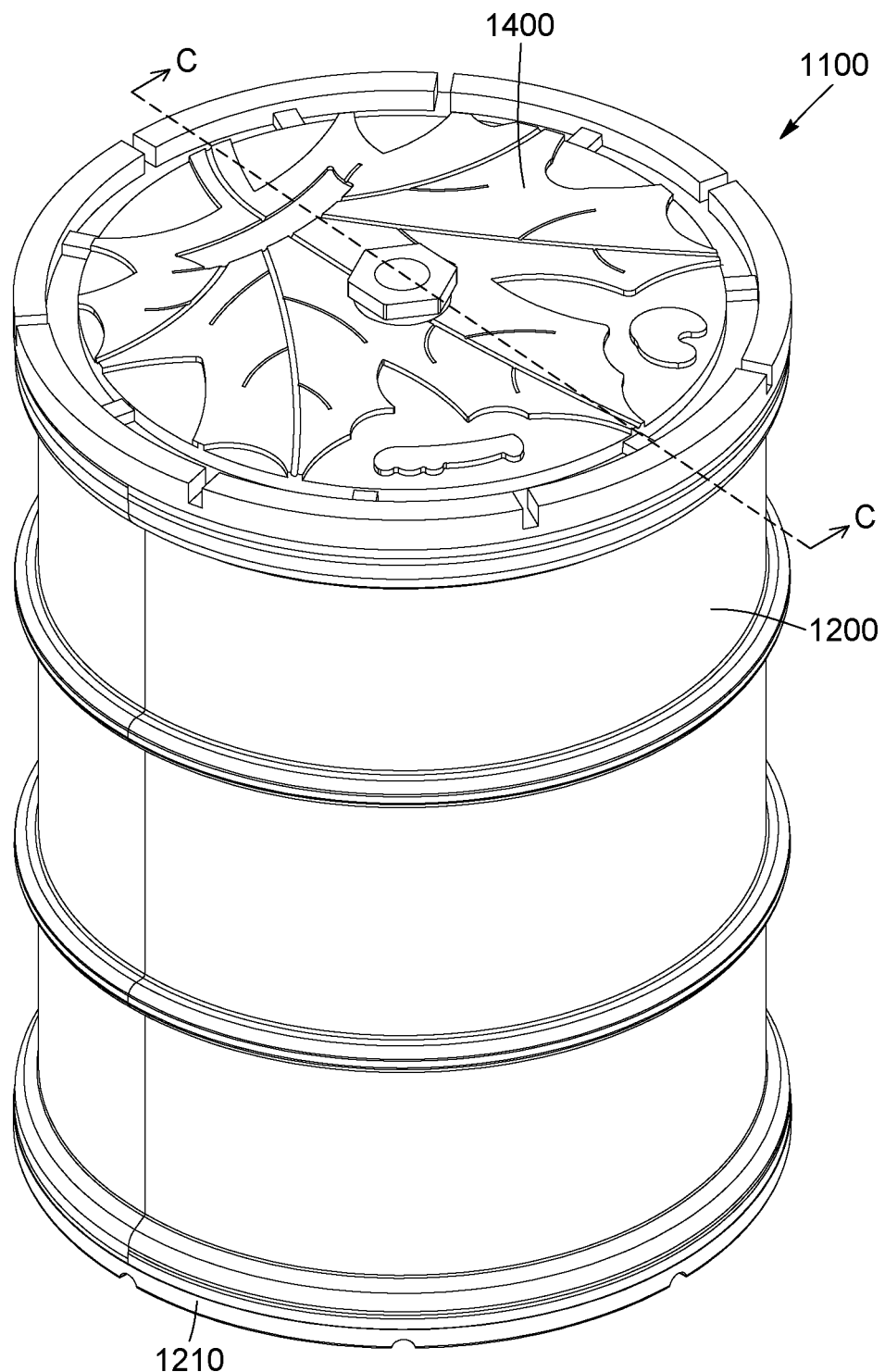
FIG. 9 is a top perspective view of a closed head composite drum assembly in accordance with a second embodiment, the closed head composite drum assembly comprising a closed head outer drum formed by a 2-step manufacturing process and an inner shell contained in an inner shell-receiving cavity defined by the closed head outer drum.
Figure 10:
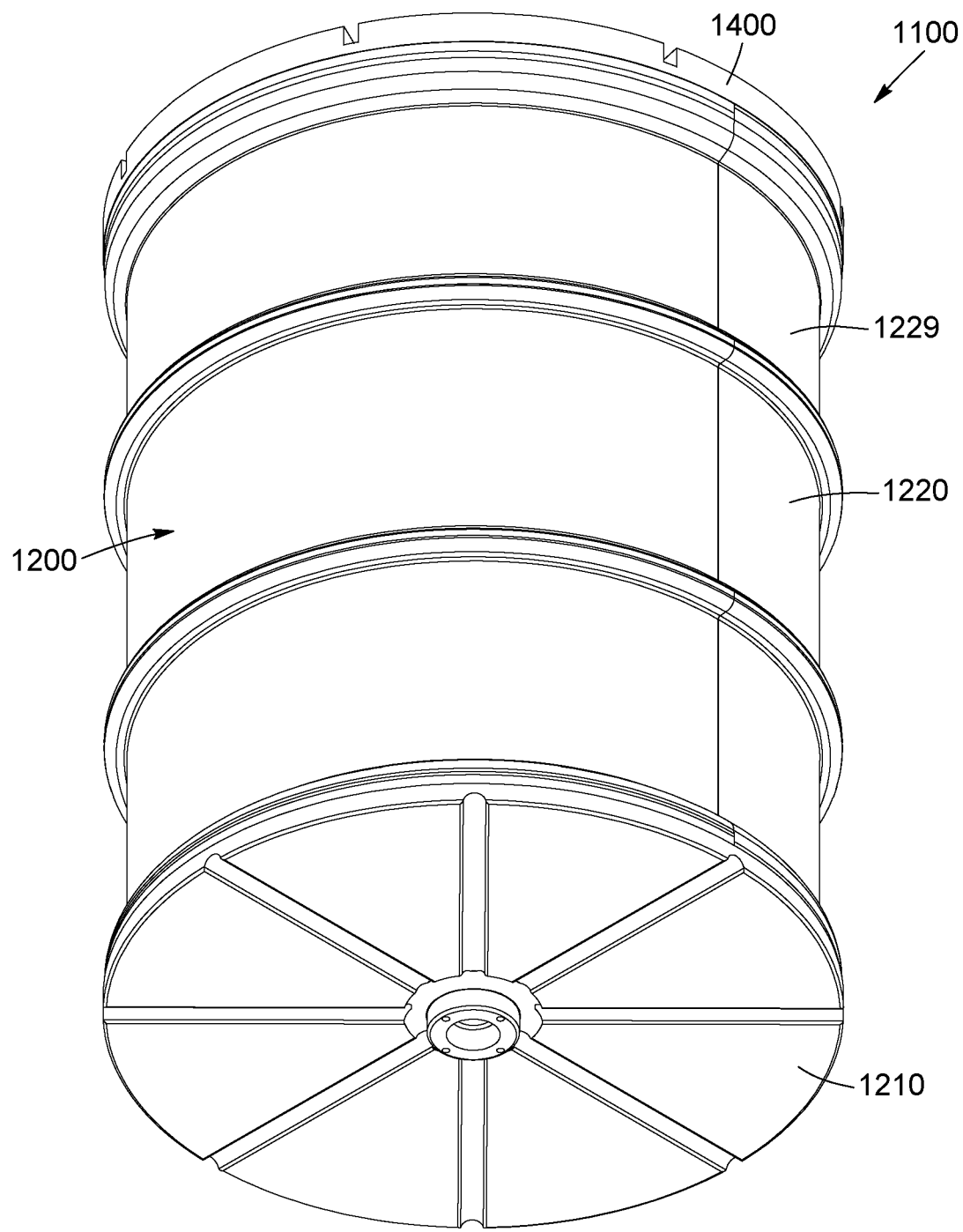
FIG. 10 is a bottom perspective view of the closed head composite drum assembly of FIG. 9.

In the embodiment shown, the process 500 comprises providing a rotational molding apparatus 700 defining a barrel-forming cavity 702, as represented for instance in FIGS. 7 to 9. The process 500 further comprises opening the rotational molding apparatus 700; inserting the inner shell 300 in the barrel-forming cavity 702, as represented in FIG. 8; and closing the rotational molding apparatus 700.

Figure 6:
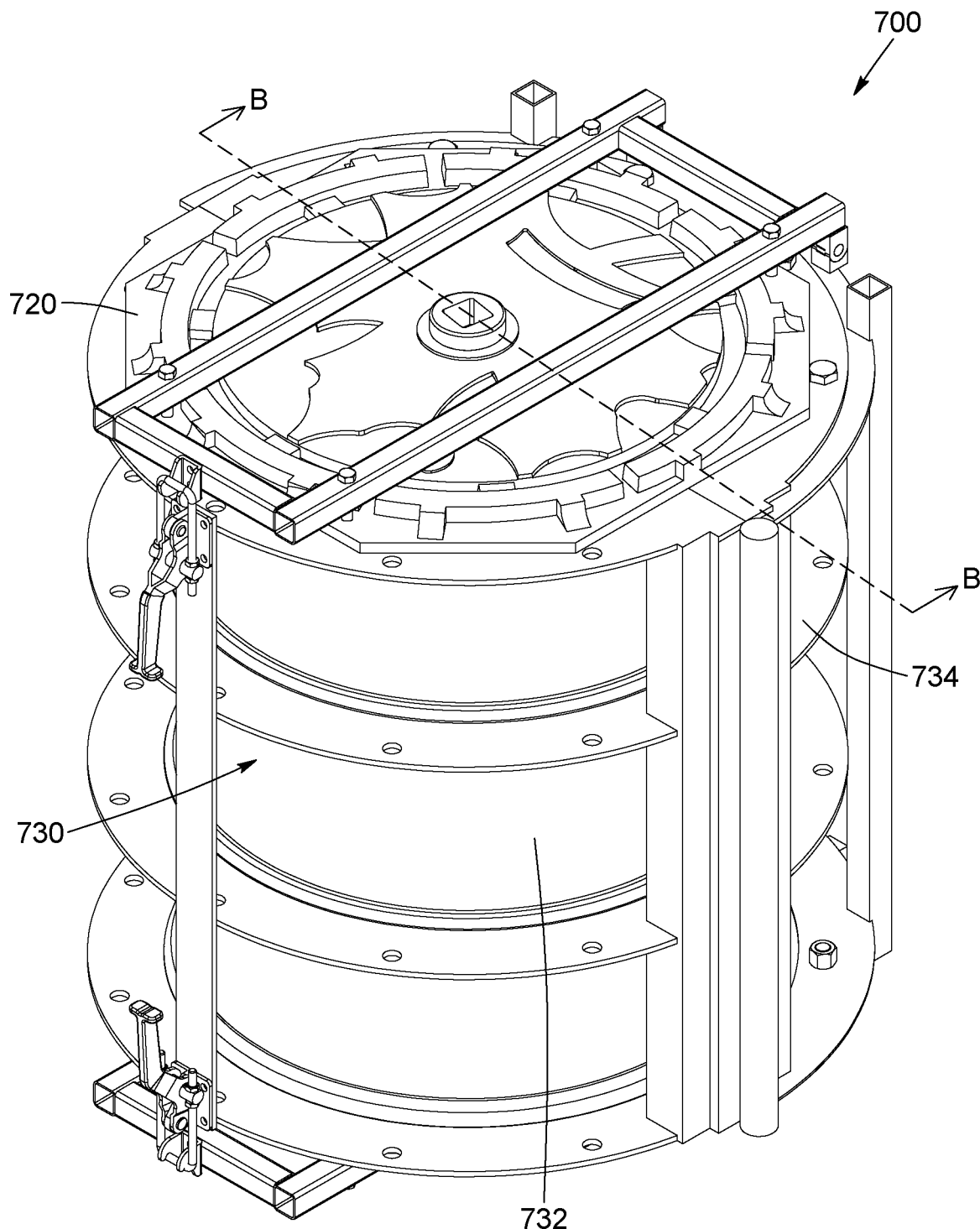
FIG. 6 is a top perspective view of a rotational molding apparatus for manufacturing the closed head composite drum assembly of FIG. 1, with the closed head composite drum assembly being engaged therewith.

In the embodiment shown, the rotational molding apparatus 700 comprises a bottom mold portion 710, a top mold portion 720 and a mold peripheral wall 730 extending between the bottom and top mold portions 710, 720. In the embodiment shown, as represented for instance in FIGS. 6 and 7, the mold peripheral wall 730 comprises two substantially semi-cylindrical mold members 732, 734 removably securable to each other to configure the rotational molding apparatus 700 in a closed configuration. The rotational molding apparatus 700 has an inner surface 704 formed at least partially by inner surfaces of the bottom mold portion 710, the top mold portion 720 and the mold peripheral wall 730 (for instance the semi-cylindrical mold members 732, 734 thereof), the inner surface 704 of the rotational molding apparatus 700 at least partially delimiting the barrel-forming cavity 702. It is understood that the inner surface 704 of the rotational molding apparatus 700 corresponds substantially to an outer surface of the closed head composite drum assembly 100 formed therein (i.e., to the outer surface of the outer plastic shell 200 or closed head outer drum 200 thereof). The terms top and bottom with respect to the rotational molding apparatus 700 should be understood with reference to the portions of the closed head composite drum assembly 100 they are respectively configured to form at least partially. In other words, the top mold portion 720 is shaped and dimensioned to form at least partially the barrel cover 400, whereas the bottom mold portion 710 is shaped and dimensioned to form at least partially the drum base 210.

In the embodiment shown, at least one of the top and bottom mold portions is removably mountable to the mold peripheral wall 730. In the embodiment shown, the mold peripheral wall 730 is substantially cylindrical and forms upper and lower mold openings 731, 733 at least partially closed respectively by the top and bottom mold portions 720, 710. In the embodiment shown, the step of opening the rotational molding apparatus 700 prior to the insertion of the inner shell 300 in the barrel-forming cavity 702 thereof comprises removing at least partially one of the top and bottom mold portions 720, 710 (for instance the bottom mold portion 710) in order to at least partially uncover the corresponding one of the upper and lower mold openings, thus allowing the insertion of the inner shell 300 in the barrel-forming cavity 702.

In the embodiment shown, the process 500 comprises pre-heating the rotational molding apparatus 700 in an oven, prior to the step of inserting the inner shell 300 in the barrel-forming cavity 702 thereof.

In the embodiment shown, the process 500 comprises, after the step of inserting the inner shell 300 in the barrel-forming cavity 702, removably mounting the inner shell 300 to the rotational molding apparatus 700 (for instance to the inner surface 704 thereof). In the embodiment shown, the process 500 comprises turning the rotational molding apparatus 700 upside down (i.e., with the top mold portion 710 being arranged downwardly with respect to the bottom mold portion 720) to ease the insertion of the inner shell in the barrel-forming cavity 702.

For instance, the process 500 further comprises removably mounting the inner shell 300 to the top mold portion 720 (for instance to the inner surface thereof) via a top spacing member 750 engaged with the material-filling opening 332 of the inner shell 300. For instance, the inner shell 300 is arranged in the barrel-forming cavity 702 so that a top portion 330 of the inner shell 300 is at least partially spaced apart from the inner surface of the top mold portion 720. It is understood that the use of the top spacing member 750 ensures that the bung opening formed in the barrel cover 400 is in register with the material-filling opening 332 of the inner shell 300.

In the embodiment shown, the process 500 further comprises inserting a powder-guiding device (not represented) in the barrel-forming cavity 702, removably mounting the powder-guiding device to the inner shell 300 arranged in the barrel-forming cavity 702 and pouring plastic powder in the barrel-forming cavity around the inner shell 300. The use of the powder-guiding device contributes to a substantially even distribution of the plastic powder around the inner shell 300 in the barrel-forming cavity 702.

The process 500 then comprises removing the powder-guiding device from the barrel-forming cavity 702 and configuring the rotational molding apparatus 700 in a closed configuration, for instance by removably mounting the bottom mold portion 710 to the mold peripheral wall 730, in order to at least partially cover the lower mold opening.

In the embodiment shown, the process 500 further comprises removably mounting the inner shell (for instance a base 310 thereof) to the bottom mold portion 710 (for instance to the inner surface thereof) via a bottom spacing member 760. In the embodiment shown, a spacer-engaging opening 712 is formed in the bottom mold portion 710 (for instance in a substantially central portion thereof) of the rotational molding apparatus 700, the bottom spacing member 760 being removably engaged with the inner shell 300 through the spacer-engaging opening 712, from an exterior of the rotational molding apparatus 700. For instance, the inner shell 300 is arranged in the barrel-forming cavity 702 so that the base 310 of the inner shell 300 is at least partially spaced apart from the inner surface of the bottom mold portion 710.

It is thus understood that the inner shell 300 is substantially suspended within the barrel-forming cavity 702. In other words, during the rotomolding of the closed head outer drum 200, the inner shell 300 is kept substantially coaxial with the mold peripheral wall 730 and the side wall 320 of the inner shell 300 is at least partially kept spaced-apart from the inner surface of the mold peripheral wall.

The step 520 of at least partially rotomolding the closed head outer drum 200 comprises placing the rotational molding apparatus 700 in an oven; and rotating the rotational molding apparatus 700, for instance about two rotational axes, for instance substantially perpendicular to each other. In the embodiment shown, the rotomolding of the closed head outer drum 200 comprises at least one firing cycle. In some embodiments, the firing cycle is realized at a temperature comprised between about 100° F. and about 700° F. In some other embodiments, the firing cycle is realized at a temperature comprised between about 200° F. and about 600° F. In some other embodiments, the firing cycle is realized at a temperature comprised between about 400° F. and about 500° F. In yet some other embodiments, the firing cycle is realized at a temperature comprised between about 425° F. and about 475° F. In some embodiments, the firing cycle is realized during a period having a duration comprised between about 10 minutes and about 60 minutes. In some other embodiments, the duration of the cycle is comprised between about 15 minutes and about 50 minutes. In some other embodiments, the duration of the cycle is comprised between about 20 minutes and about 30 minutes.

In the embodiment shown, the process 500 further comprises, after the firing cycle, removing the rotational molding apparatus 700 from the oven. The process might comprise cooling the rotational molding apparatus for a cooling duration comprised for instance between 5 minutes and 60 minutes. In the embodiment shown, the cooling duration is comprised between about 10 minutes and about 30 minutes. In some other embodiments, the cooling duration is comprised between about 15 minutes and about 25 minutes. In some embodiments, the cooled rotational molding apparatus 700 has a temperature comprised between about 50° F. and about 200° F. In some other embodiments, the cooled rotational molding apparatus 700 has a temperature comprised between about 75° F. and about 150° F. In yet some other embodiments, the cooled rotational molding apparatus has a temperature comprised between about 100° F. and about 120° F.

In the embodiment shown, the process 500 comprises turning the rotational molding apparatus 700 with the closed head composite drum assembly 100 therein upside down (i.e. with the top mold portion 710 being arranged upwardly with respect to the bottom mold portion 720, as represented in FIG. 8).

The process 500 further comprises configuring the rotational molding apparatus 700 in the open configuration (for instance by at least partially removing the top mold portion 710 in order to at least partially uncover the upper mold opening 731). The process might further comprise removably mounting a shape-maintaining device (or distortion-limiting device—not represented) to the rotomolded closed head outer drum 200 (for instance to the top spacing member 750 removably engaged with the material-filling opening 332 of the inner shell 300). The shape-maintaining device is configured to limit a distortion of the bung opening 402 of the outer drum 200 upon cooling thereof (and more particularly upon shrinkage of the closed head outer drum 200 during the cooling thereof). Upon shrinkage of the closed head outer drum 200, the outer drum 200 at least partially contacts the outer surface of the inner shell 300 and the barrel cover 400 at least partially surrounds and contacts the barrel cover-coupling portion 304 of the inner shell 300, thus ensuring a fluid-tight contact therebetween.

The process further comprises removing the closed head composite drum assembly 100 from the barrel-forming cavity 702 of the rotational molding apparatus 700 and removing the bottom spacing member 760.

The present disclosure is not limited to the above-described double wall closed head drum assembly and to the above-described corresponding manufacturing process.

2$^{nd}$ Variant

Referring to FIGS. 9 to 13, there is shown a closed head composite drum assembly 1100 (or plastic-insulated closed head drum assembly 1100) in accordance with a second embodiment.

Similarly to the first embodiment, the double wall closed head drum assembly 1100 comprises a closed head outer drum 1200 defining an inner shell-containing cavity 1202, a bung opening 1402 being formed in the closed head outer drum 1200 (i.e., the inner shell-containing cavity 1202 forms the bung opening 1402 in the closed head outer drum 1200); and an inner shell 1300 at least partially contained in the inner shell-containing cavity 1202, a material-filling opening 1332 being formed in the inner shell 1300 substantially in register with the bung opening 1402. Similarly to the first embodiment, the closed head outer drum 1200 is at least partially made of plastic, for instance at least partially rotomolded. Similarly to the first embodiment, the closed head outer drum 1200 comprises a drum base 1210, a drum sidewall 1220 having a peripheral wall 1229 with an upper portion 1222 and an upper rim 1230 (or peripheral rim 1230) extending from the upper portion 1222 of the peripheral wall 1229 and defining a cover-connecting edge 1231 of the drum sidewall 1220. The closed head outer drum 1200 further comprises a barrel cover 1400 irremovably secured to the cover-connecting edge 1231 and delimiting therewith at least partially the inner shell-containing cavity 1202.

As detailed below, in this second embodiment, the closed head outer drum 1200 is manufactured via a process comprising at least two successive steps: a first step consisting in providing an open head outer drum 1600 (FIG. 13) forming at least partially the drum sidewall 1220 defining the cover-connecting edge 1231 and the drum base 1210, and a second step wherein the barrel cover 1400 is rotomolded onto the cover-connecting edge 1231 of the drum sidewall 1220 (i.e., rotomolded onto a portion of the drum sidewall 1220).

Figure 13:
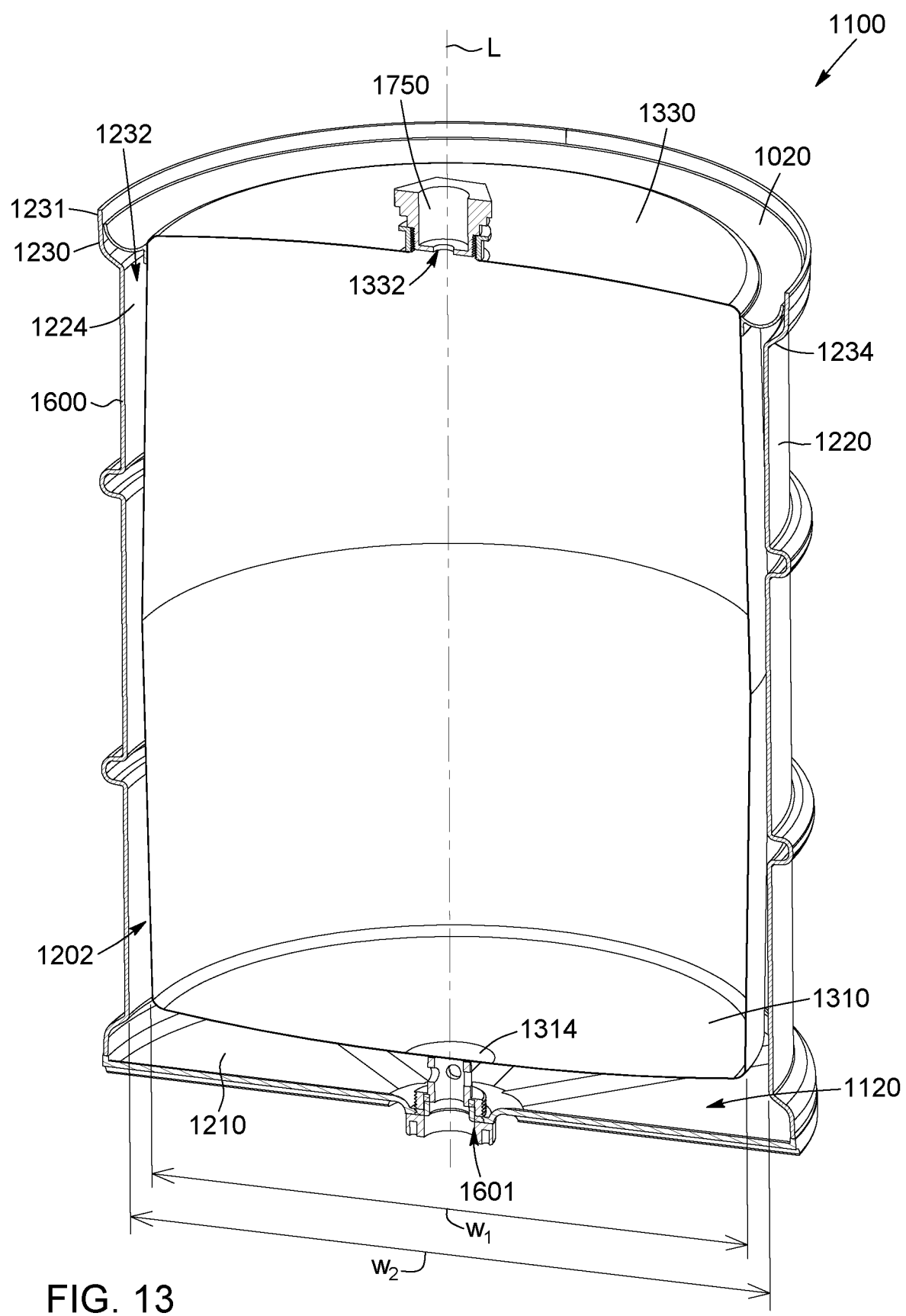
FIG. 13 is a top perspective view of the closed head composite drum assembly of FIG. 11, without a barrel cover of the closed head outer drum.

As best shown in FIG. 13, the inner shell-containing cavity 1202—or inner shell-receiving cavity 1202—is at least partially delimited by the drum sidewall 1220 and the drum base 1210 of the open head outer drum 1600 and forms an upper opening 1232 at least partially delimited by the upper rim 1230. The barrel cover 1400 is shaped and dimensioned, when irremovably secured to the cover-connecting edge 1231 of the drum sidewall 1220, to close at least partially the upper opening 1232.

Figure 11:
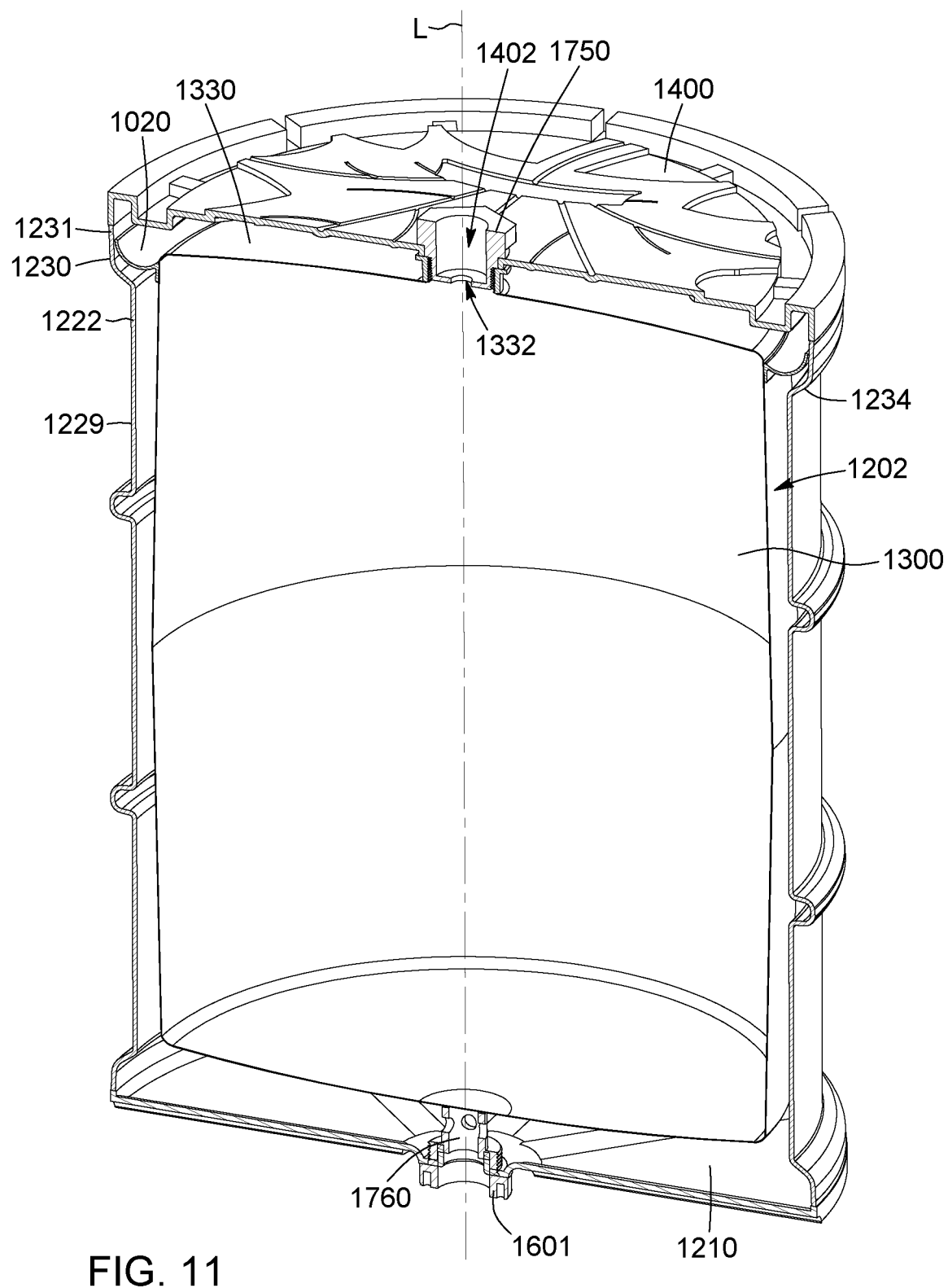
FIG. 11 is a top perspective sectional view of the closed head composite drum assembly of FIG. 9 taken along cross-section lines C-C.
Figure 12:
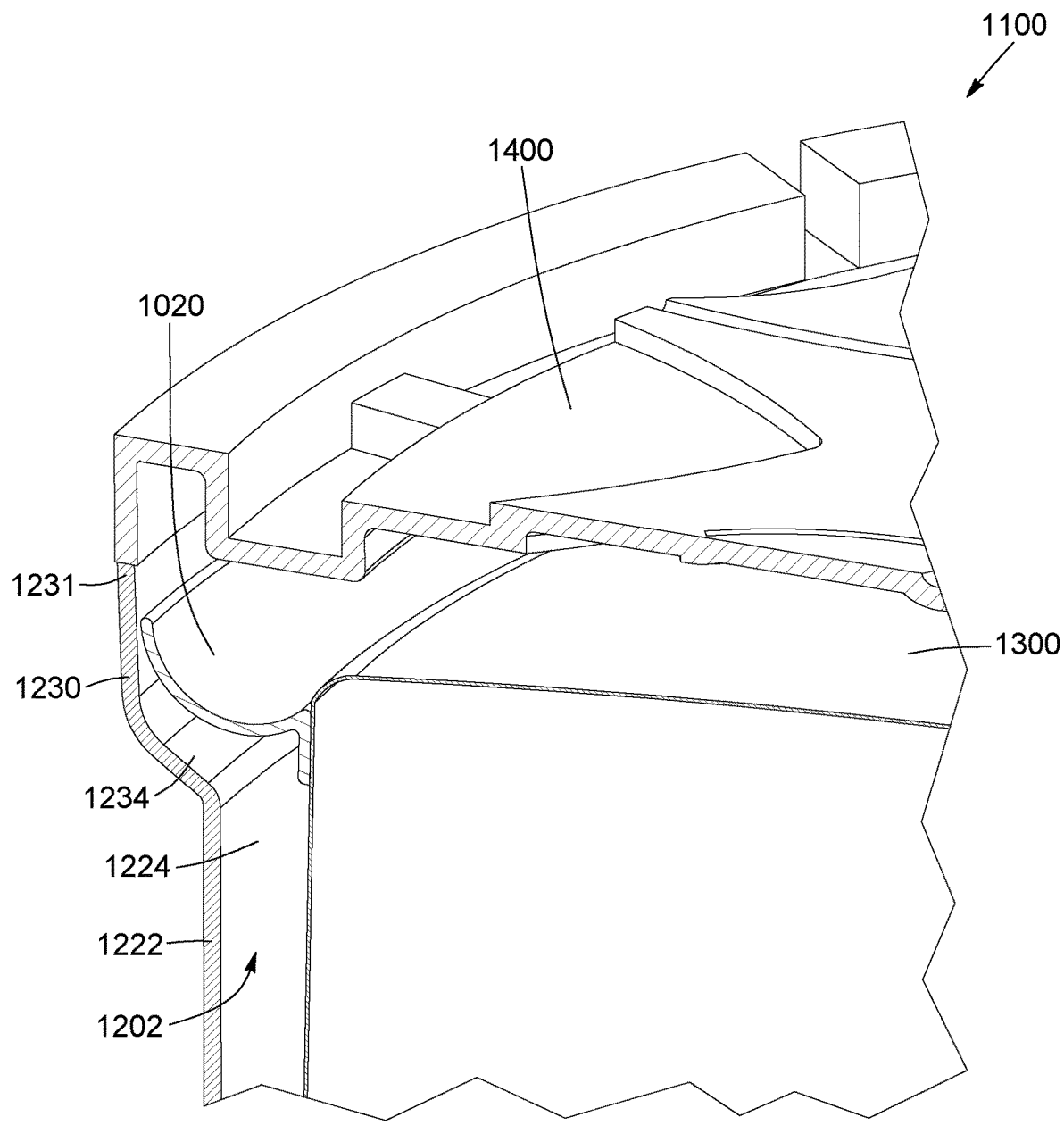
FIG. 12 is an enlarged cross-section view of an upper portion of the closed head composite drum assembly of FIG. 11.

As best shown in FIGS. 11 to 13, a joint-receiving shoulder 1234 is formed at a junction of an inner surface of the upper rim 1230 and an inner surface 1224 of the peripheral wall 1229 of the drum sidewall 1220 (in particular at a junction of the inner surface of the upper rim 1230 and an inner surface of the upper portion 1222 of the peripheral wall 1229). In the embodiment shown, the joint-receiving shoulder 1234 extends in the interior cavity 1202 (or inner shell-containing cavity) along at least a portion of the periphery of thereof (along substantially an entirety of the periphery thereof, in the embodiment shown). The joint-receiving shoulder 1234 extends in a plane substantially transversal to the longitudinal axis L of the closed head outer shell 1200 (in a plane slightly inclined thereto, in the embodiment shown). It could also be conceived a barrel wherein the joint-receiving shoulder would be substantially perpendicular to the longitudinal axis L.

In the embodiment shown, the upper rim 1230 defines a central opening, which is substantially circular in shape, adjacent to the upper portion 1222 of the peripheral wall 1229.

In the embodiment shown, the inner shell 1300, which is also at least partially made of stainless steel, comprises a top portion 1330 which is substantially planar and extends in a plane substantially perpendicular to the longitudinal axis L when the inner shell 1300 is at least partially inserted in the inner shell-receiving cavity 1202 of the outer shell 1200.

Process for Manufacturing the $2^{nd}$ Variant of the Composite Drum Assembly

Similarly to the first embodiment, the process for manufacturing the closed head composite drum assembly 1100 in accordance with the second embodiment comprises providing an inner shell 1300 defining a material-receiving cavity forming a material-filling opening in the inner shell; rotomolding at least partially a closed head outer drum 1200 defining an inner shell-containing cavity, the closed head outer drum at least partially enclosing the inner shell; and forming a bung opening in the closed head outer drum substantially in register with the material-filling opening.

In the second embodiment, the manufacturing process comprises a step of providing an open head outer shell 1600 defining at least partially the inner shell-receiving cavity 1202 and comprising a free edge (or cover-connecting edge 1231, for instance at least partially formed by an upper rim 1230 thereof), the inner shell-receiving cavity 1202 forming an opening 1232 (an upper opening in the embodiment shown or inner shell-inserting opening 1232) at least partially delimited by the cover-connecting edge. The process further comprises a step of inserting at least partially the inner shell 1300 through the opening 1232 in the inner shell-receiving cavity 1202, and a step of rotomolding a barrel cover 1400 onto the cover-connecting edge (for instance onto the upper rim 1230) of the open head outer drum 1600 so as to close at least partially the opening 1232 and to form the closed head outer drum 1200. Even though in the embodiment shown, the barrel cover 1400 is rotomolded onto the upper rim 1230, it could be conceived a process wherein the barrel cover would be rotomolded onto any other free edge (lower or upper) or portion of the open head outer shell 1600.

In the embodiment shown, the step of providing the open head outer shell 1600 comprises a step of rotomolding the open head outer shell 1600, so that the closed head outer drum 1200 is manufactured in at least two rotomolding steps.

In the embodiment shown, upon rotomolding thereof, an intermediate closed shell is formed which comprises the drum sidewall 1220 forming at least partially the cover-connecting edge. The intermediate closed shell further comprises the drum base 1210 and a cover portion (not represented) at least partially closing the inner shell-receiving cavity 1202 at least partially delimited by the drum sidewall and the drum base. For instance, the cover portion extends inwardly (with respect to the inner shell-receiving cavity 1202 and to the cover-connecting edge) from an inner surface of the intermediate closed shell. For instance, the cover portion extends inwardly from a junction between an upper rim 1230—which extends from an upper portion 1222 of a peripheral wall 1229 of the drum sidewall 1220—and the upper portion 1222 of the drum sidewall 1220. In other words, in the embodiment shown, the cover portion might be axially offset (considered along the longitudinal axis L of the open head outer shell 1600) with respect to the cover-connecting edge 1231.

The manufacturing process further comprises at least partially removing the cover portion of the intermediate outer shell so as to form the inner shell-inserting opening 1232. In other words, the cover portion of the intermediate outer shell is removed, for instance by being cut out from the junction of the peripheral wall 1229 of the drum sidewall 1220 and the upper rim 1230 thereof, so as to provide access to the interior cavity 1202 (or inner shell-containing cavity 1202). It could also be conceived a process wherein the inner shell-inserting opening 1232 (or upper opening, in the embodiment shown) could be formed during the step of rotomolding the open head outer shell 1600.

For instance, a remaining peripheral portion of the cover portion forms a joint-receiving shoulder 1234 (FIGS. 11 to 13) extending in the interior cavity 1202 of the open head outer shell 1600 along at least a portion of a periphery thereof (along substantially an entirety of the periphery thereof, in the embodiment shown) and extending in a plane transversal to (or defining an oblique angle with respect to) the longitudinal axis L of the open head outer shell 1600.

In the embodiment shown, the step of providing the open head outer shell 1600 comprises a first firing cycle. In some embodiments, the first firing cycle is realized at a temperature comprised between about 100° F. and about 500° F. In some other embodiments, the first firing cycle is realized at a temperature comprised between about 200° F. and about 400° F. In some embodiments, the first firing cycle is realized during a first period having a duration comprised between about 10 minutes and about 90 minutes. In some other embodiments, the first period of the first firing cycle has a duration comprised between about 15 minutes and about 60 minutes.

Dimensions of the inner shell 1300 are slightly smaller than dimensions of the open head outer shell 1600 after the open head outer shell 1600 has been rotomolded (i.e., at the step of engaging at least partially the inner shell 1300 through the inner shell-inserting opening 1232 with the inner shell-receiving cavity 1202 at least partially delimited by the open head outer shell 1600). In some embodiments, at least an outer width w1 (considered in a direction substantially perpendicular to the longitudinal axis L—FIG. 13) of the inner shell 1300 is slightly smaller than an inner width w2 (i.e., a width of the inner shell-receiving cavity 1202) of the open head outer shell 1600 at a height corresponding to the drum sidewall 1220 of the open head outer shell 1600. In some embodiments, the dimensions of the inner stainless-steel shell 1300 are at least 1% smaller than the dimensions of the open head outer shell 1600. In some other embodiments, the dimensions of the inner shell 1300 are at least 2% smaller than the dimensions of the open head outer shell 1600. In some other embodiments, the dimensions of the inner shell 1300 are at least 3% smaller than the dimensions of the open head outer shell 1600. The inner shell 1300 and the open head outer shell 1600 are thus shaped and dimensioned to ease the insertion of the inner shell 1300 in the interior cavity 1202, and to allow shrinkage of the drum sidewall 1220 and/or the drum base 1210 upon cooling thereof at the end of the manufacturing process.

Upon cooling of the closed head outer shell 1200 comprising the open head outer shell 1600 and the barrel cover 1400 rotomolded onto a portion thereof, after completion of the manufacturing process, the drum sidewall 1220 at least partially contacts a sidewall 1320 (or peripheral wall 1320) of the inner shell 1300, along at least a longitudinal portion thereof (for instance at a central portion thereof). Moreover, upon cooling of the closed head outer shell 1200 at the end of the manufacturing process, the drum base 1210 at least partially contacts a base 1310 of the inner shell 1300, for instance at a central portion 1314 of the inner shell base 1310. In some implementations, after completion of the manufacturing process, the drum sidewall 1220 of the closed head outer shell 1200 is also at least partially spaced-apart from the sidewall 1320 (or peripheral wall 1320) of the inner shell 1300, along at least the longitudinal portion thereof. Moreover, upon cooling of the closed head outer shell 1200, the drum base 1210 is also at least partially spaced-apart from the base 1310 of the inner shell 1300, for instance peripherally from the central portion 1314 of the base 1310, so as to form a lower shock-absorbing spacing 1120 inbetween.

After the first rotomolding step (i.e., after the manufacturing of the open head outer shell 1600), a portion of the rotational molding apparatus is removed (for instance the top mold portion thereof). In other words, an upper portion of the open head outer shell 1600 is unmolded.

After the step of inserting at least partially the inner shell 1300 through the inner shell-inserting opening 1232 in the inner shell-receiving cavity 1202, and before the step of rotomolding the barrel cover 1400 onto the cover-connecting edge (for instance at least partially formed by the upper rim 1230) of the open head outer shell 1600, the process comprises, in the embodiment shown, a step of mounting a sealing joint 1020 (or sealing member 1020, or peripheral sealing member 1020) between the upper rim 1230 of the open head outer shell 1600 and an upper portion of the inner shell 1300. For instance, the sealing joint 1020 is arranged (for instance secured, for instance glued) onto or proximate the joint-receiving shoulder 1234. The sealing joint 1020 is configured to limit the risk of plastic powder being poured between an outer surface of the inner shell 1300 and an inner surface of the open head outer shell 1600 at least partially delimiting the inner shell-receiving cavity 1202.

The step of rotomolding the barrel cover 1400 onto the upper rim 1230 (or second rotomolding step, in the embodiment in which the open head outer shell 1600 is rotomolded) comprises pouring plastic powder onto a top portion 1330 (or cover portion 1330) of the stainless-steel inner shell 1300 in a portion of the rotational molding apparatus at least partially containing the upper portion 1222 and the upper rim 1230 of the open head outer shell 1600. The step comprises at least partially covering the top portion 1330 of the inner shell 1300 with the barrel cover 1400.

For instance, the second rotomolding step comprises a second firing cycle having a second duration comprised between about 15 minutes and about 45 minutes. In some embodiments, the second firing cycle has a second duration comprised between about 25 minutes and about 35 minutes. In some other embodiments, the second firing cycle has a second duration of about 30 minutes. In some embodiments, the second firing cycle is realized at a temperature comprised between about 100° F. and about 500° F. In some other embodiments, the second firing cycle is realized at a temperature comprised between about 200° F. and about 400° F.

In some embodiments, during the second rotomolding step, the inner shell 1300 is kept substantially coaxial with the open head outer shell 1600 and the side wall 1320 of the inner shell 1300 is kept at least partially spaced-apart from the sidewall 1220 of the open head outer shell 1600. In some embodiments, the base 1310 of the inner shell 1300 is kept spaced-apart from the drum base 1210 during the second rotomolding step.

For instance, a bottom spacing member or lower stopper 1760 could be engaged with a stopper-receiving aperture 1601 or bottom spacer-receiving aperture 1601 formed in the drum base 1210 of the open head outer shell 1600 (for instance in the central portion 1212 thereof) and further connected to the rotational molding apparatus. The bottom spacing member 1760 is shaped and dimensioned to prevent the base 1310 of the inner shell 1300 from contacting the drum base 1210 of the open head outer shell 1600 when engaged with the inner cavity 1202 thereof.

For instance, an upper stopper 1750 or top spacing member 1750 is engaged with an opening formed in the top portion 1330 of the inner shell 1300 (for instance in the material-filling opening 1332 thereof) and further connected to the rotational molding apparatus. The top spacing member 1750 is shaped and dimensioned to prevent the barrel cover 1400 from contacting the top portion 1330 of the inner shell 1300 upon rotomolding thereof.

In other words, the inner shell 1300 is at least partially suspended in the inner shell-receiving cavity 1202 of the open head outer shell 1600 and in the barrel-forming cavity of the rotational molding apparatus upon rotomolding of the barrel cover 1400 onto the open head outer shell 1600.

In some embodiments, a same oven (for instance an electrical oven) as the one used for the first rotomolding step (i.e., for the rotomolding of the open head outer shell 1600) is used for the second rotomolding step (i.e., for the remolding of the barrel cover 1400).

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

What is claimed is:

1. A process for manufacturing a closed head composite drum assembly, comprising:
    providing an inner shell defining a material-receiving cavity forming a material-filling opening in the inner shell;
    providing a bottom spacing member;
    providing a rotational molding apparatus defining a barrel-forming cavity and comprising a bottom mold portion;
    opening the rotational molding apparatus;
    inserting the inner shell in the barrel-forming cavity;
    removably mounting the inner shell to the bottom mold portion of the rotational molding apparatus via the bottom spacing member, a base of the inner shell being at least partially spaced apart from an inner surface of the bottom mold portion;
    closing the rotational molding apparatus;
    rotomolding at least partially a closed head outer drum defining an inner shell-containing cavity, the closed head outer drum at least partially enclosing the inner shell, the closed head outer drum having a drum base with a stopper-receiving aperture formed therein with the bottom spacing member at least partially engaged therewith; and
    forming a bung opening in the closed head outer drum substantially in register with the material-filling opening.

2. The process according to claim 1, wherein the rotational molding apparatus comprises a top mold portion and a mold peripheral wall extending between the bottom and top mold portions, the process further comprising removably mounting the inner shell to the top mold portion.

3. The process according to claim 2, comprising removably mounting the inner shell to the top mold portion via a top spacing member engaged with the material-filling opening of the inner shell, a top portion of the inner shell being at least partially spaced apart from an inner surface of the top mold portion.

4. The process according to claim 1, wherein a spacer-engaging opening is formed in the bottom mold portion, the bottom spacing member being engaged with the inner shell through the spacer-engaging opening from an exterior of the rotational molding apparatus.

5. The process according to claim 1, comprising:
    placing the rotational molding apparatus in an oven;
    rotating the rotational molding apparatus about two rotational axes;
    removing the rotational molding apparatus from the oven;
    opening the rotational molding apparatus; and
    removably mounting a distortion-limiting device to the rotomolded closed head outer drum.

6. The process according to claim 1, wherein the closed head outer drum comprises a drum sidewall extending upwardly from the drum base and defining a cover-connecting edge, the closed head outer drum further comprising a barrel cover irremovably secured to the cover-connecting edge and delimiting with the drum sidewall and the drum base at least partially the inner shell-containing cavity, the process comprising rotomolding in a single rotational molding step at least partially the barrel cover and the drum sidewall.

7. The process according to claim 1, wherein at least partially rotomolding the closed head outer drum comprises:
    providing an open head outer drum defining at least partially the inner shell-containing cavity and comprising a cover-connecting edge, the inner shell-containing cavity forming an inner shell-inserting opening at least partially delimited by the cover-connecting edge;
    inserting at least partially the inner shell through the inner shell-inserting opening in the inner shell-containing cavity; and
    rotomolding a drum cover onto the cover-connecting edge so as to close at least partially the inner shell-inserting opening.

8. The process according to claim 7, comprising rotomolding at least partially the open head outer drum, wherein rotomolding at least partially the open head outer drum comprises:
    rotomolding an intermediate outer shell comprising a drum base, a drum sidewall extending upwardly from the drum base and delimiting at least partially therewith the inner shell-containing cavity, the intermediate outer shell further comprising a cover portion at least partially closing the inner shell-containing cavity; and
    removing the cover portion to form the open head outer drum.

9. The process according to claim 8, comprising:
    mounting a peripheral sealing member between an upper rim of the open head outer drum and an upper portion of the inner shell; and
    pouring plastic powder in the rotational molding apparatus onto the upper portion of the inner shell.

10. A closed head drum composite assembly, comprising:
    a closed head outer drum defining an inner shell-containing cavity forming a bung opening in the closed head outer drum; and
    an inner shell at least partially contained in the inner shell-containing cavity, a material-filling opening being formed in the inner shell substantially in register with the bung opening;
    wherein the closed head outer drum comprises a drum base with a stopper-receiving aperture formed therein;
    wherein the closed head outer drum further comprises an inner base-abutting portion engaged with the stopper-receiving aperture;
    wherein the closed head outer drum is at least partially made of plastic.

11. The closed head drum composite assembly according to claim 10, wherein the closed head outer drum comprises:
    a drum sidewall defining a cover-connecting edge, and
    a barrel cover irremovably secured to the cover-connecting edge of the drum sidewall and delimiting with the drum sidewall and the drum base at least partially the inner shell-containing cavity;
    the bung opening being formed in the barrel cover.

12. The closed head drum composite assembly according to claim 10, wherein the inner shell comprises at least one of a barrel cover-coupling portion surrounding at least partially the material-filling opening and protruding outwardly from an outer surface of the inner shell, the barrel cover-coupling portion being engaged with the bung opening, and a cover portion in which the material-filling opening is formed, the cover portion being at least partially spaced-apart from an inner surface of the barrel cover and delimits therewith an upper shock-absorbing spacing, wherein the cover portion of the inner shell has an outer surface forms a convexity towards the bung opening.

13. The closed head drum composite assembly according to claim 10, wherein the inner base-abutting portion distances the inner shell from the drum base.

14. The closed head drum composite assembly according to claim 10, wherein the stopper-receiving aperture is formed in a central portion of the drum base.

15. The closed head drum composite assembly according to claim 10, wherein the inner base-abutting portion protrudes inwardly from an inner surface of the drum base and at least partially supports the base of the inner shell.

16. The closed head drum composite assembly according to claim 10, wherein the barrel cover is substantially flat shaped.

17. The closed head drum composite assembly according to claim 10, wherein the closed head outer drum defines a fluid-tight closing of the inner shell-containing cavity.

* * * * *